United States Patent
Xiong et al.

(10) Patent No.: US 10,927,931 B2
(45) Date of Patent: *Feb. 23, 2021

(54) ROBOT AND ARM ASSEMBLY THEREOF

(71) Applicant: UBTECH Robotics Corp, Shenzhen (CN)

(72) Inventors: Youjun Xiong, Shenzhen (CN); Zuyi Mao, Shenzhen (CN); Xinpu Chen, Shenzhen (CN); Gao Yang, Shenzhen (CN); Defu Liu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 78 days.

This patent is subject to a terminal disclaimer.

(21) Appl. No.: 16/286,631

(22) Filed: Feb. 27, 2019

(65) Prior Publication Data

US 2020/0182337 A1 Jun. 11, 2020

(30) Foreign Application Priority Data

Dec. 11, 2018 (CN) .......................... 2018 1 1512720

(51) Int. Cl.
*F16H 21/44* (2006.01)
*B25J 18/00* (2006.01)
*B25J 9/12* (2006.01)

(52) U.S. Cl.
CPC .............. *F16H 21/44* (2013.01); *B25J 9/126* (2013.01); *B25J 18/00* (2013.01)

(58) Field of Classification Search
CPC .... F16H 21/44; B25J 9/126; B25J 9/06; B25J 18/00; B25J 18/04; B25J 18/005; B25J 18/06; B25J 17/0241; B25J 17/0266; B25J 15/0009; B25J 9/10; Y10S 901/19
See application file for complete search history.

(56) References Cited

U.S. PATENT DOCUMENTS

| | | | |
|---|---|---|---|
| 4,897,015 A * | 1/1990 | Abbe | B25J 9/042 414/744.8 |
| 2006/0015214 A1* | 1/2006 | Sugawara | B25J 9/106 700/245 |
| 2009/0060684 A1* | 3/2009 | Nakamoto | B25J 9/046 414/1 |
| 2013/0104686 A1* | 5/2013 | Yamazaki | B25J 17/00 74/490.05 |
| 2018/0186017 A1* | 7/2018 | Xiong | B25J 17/00 |

(Continued)

FOREIGN PATENT DOCUMENTS

| CN | 101301754 A | 11/2008 |
|---|---|---|
| CN | 104511909 A * | 4/2015 |
| CN | 204893945 U * | 12/2015 |

(Continued)

OTHER PUBLICATIONS

Define protrusion, Google Search, Jul. 26, 2020 (Year: 2020).*

*Primary Examiner* — Vinh Luong

(57) ABSTRACT

An arm assembly of a robot includes a servo coupled to the chest of the robot, an upper arm driven by the servo, a forearm rotatably coupled to the upper arm, a hand connected to an end of the forearm and rotatable about a first axis extending along a lengthwise direction of the forearm; and a hand transmission mechanism configured to transmit motion from the servo to the hand so as to drive the hand to rotate about the first axis.

11 Claims, 9 Drawing Sheets

(56) References Cited

U.S. PATENT DOCUMENTS

2019/0160656 A1* 5/2019 Xiong .................. B25J 9/126
2020/0180167 A1* 6/2020 Xiong .................. B25J 18/06

FOREIGN PATENT DOCUMENTS

| CN | 106041995 A | 10/2016 |
| CN | 107322633 A | 11/2017 |
| GB | 1108873 * | 4/1968 |

* cited by examiner

ROBOT AND ARM ASSEMBLY THEREOF

CROSS REFERENCE TO RELATED APPLICATIONS

This application claims priority to Chinese Patent Application No. 201811512720.0, filed Dec. 11, 2018, which is hereby incorporated by reference herein as if set forth in its entirety.

BACKGROUND

1. Technical Field

The present disclosure generally relates to robots, and particularly to a robot and its arm.

2. Description of Related Art

A servo is a key component of some robots. Generally, one servo can provide one rotational degree of freedom. In order to imitate human actions, a humanoid robot usually needs many servos to provide the same amount of rotational degrees of freedom. It is useful and desirable to provide a robot that needs fewer servos.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
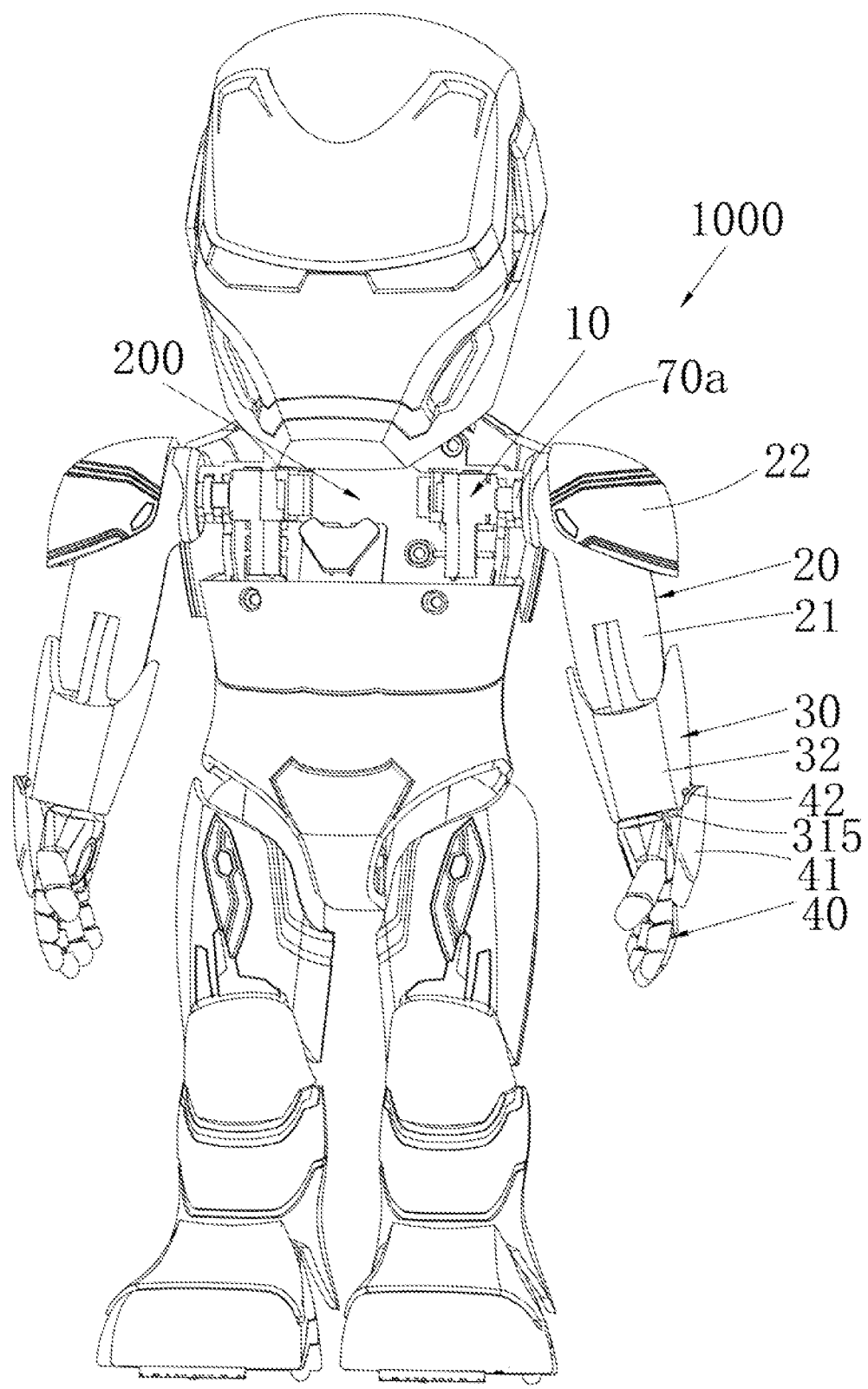
FIG. 1 is an isometric view of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-4, in one embodiment, a robot includes an arm assembly 1000 and a chest 200. The arm assembly 1000 includes a servo 10 coupled to the chest 200, an upper arm 20 driven by the servo 10, a forearm 30 rotatably coupled to the upper arm 20, and a hand 40 connected to an end of the forearm 30 and rotatable about a first axis 401 extending along a lengthwise direction of the forearm 30, and a hand transmission mechanism 50 to transmit motion from the servo 10 to the hand 40 so as to drive the hand 40 to rotate about the first axis 401.

With such configuration, the arm assembly uses only one servo to drive the upper arm 20 and the hand 40, which saves cost and facilitates simplification of motion control algorithm of the robot.

The servo 10 is fixed in the chest 200 and is electrically connected to a main control processor and executes motion commands from the main control processor. The output shaft 101 of the servo 10 is coupled to the arm assembly 1000 for driving the arm assembly 1000.

In one embodiment, the upper arm 20 includes two shells 21 connected to each other. The forearm 30 includes two shells 31 connected to each other. The hand 40 includes two shells 44 connected to each other. The upper arm 20 and the forearm 30 are pivotally connected to each other by a pivot shaft 63. Both the upper arm 20 and the forearm 30 include a mounting portion for mounting the pivot shaft 63. An upper-arm shield 22 is provided at the upper end of the upper arm 20. The forearm 30 includes a forearm shield 32.

In one embodiment, the arm assembly 1000 further includes a rotary joint 70 fixed to the output shaft 101 of the servo 10 and the upper arm 20. The rotary joint 70 transmits motion from the output shaft 101 of the servo 10 to the upper arm 20 such that the upper arm 20 can rotate with respect to the chest 200 about an axis of rotation 701. Referring to FIG. 9, the output shaft 101 of the servo 10 and the rotary joint 70 are coaxially and fixedly connected to each other via a connecting member 70a. The output shaft 101 of the servo 40 and the rotary joint 70a are connected to each other by profile shaft connection that is a connection technique that uses a shaft and a shaft hole both having non-circular cross section. The rotary joint 70a and the rotary joint 70 are connected to each other by profile shaft connection. In the embodiment, the connecting member 70a includes a shaft 71 has a non-circular cross section and the rotary joint 70 defines a shaft hole that is shaped and sized according to the shaft. The shaft of the connecting member 70a is inserted in to the shaft hole of the rotary joint 70, which allows the rotary joint 70 to rotate together with the connecting member 70a. In the embodiment as illustrated in FIG. 8, the two shells 21 each define a shaft hole 214 and opposite ends of the shaft 71 of the connecting member 71a are fit in the shaft holes 214.

Referring to FIGS. 4-5 and 8-9, in one embodiment, the arm assembly 1000 further includes a rotating member 80 rotatably connected to the rotary joint 70. The rotating member 80 and the rotary joint 70 are coaxial. The rotating member 80 is rotatable about the rotation axis of the rotary joint 70. The rotary joint 70 defines a receiving hole 72. The rotating member 80 includes a shaft 81 that is fit in the receiving hole to rotatably connect the rotating member 80 to the rotary joint 70. The rotating member 80 includes a first lever 82 and a second lever 83 that are circumferentially spaced apart from each other. The arm assembly 1000 further includes a fixed post 90 securely connected to the chest 200. The second lever 83 is used to contact the fixed post 90 such that the rotating member 80 can be pushed by the fixed post 90 to rotate with respect to the rotary joint 70. When the rotating member 80 rotates to a position where the first lever 82 comes into contact with the hand transmission mechanism 50, the hand transmission mechanism 50 starts to operate to drive the hand to rotate about the first axis 401 extending along a lengthwise direction of the forearm 30. The fixed post 90 and the second lever 83 are in a same vertical plane. When the servo 10 drives the rotary joint 70 to rotate, the fixed post 90 can come into contact with and apply a push force to the second lever 83, thereby rotating the rotating member 80. The arm assembly 1000 has a forearm transmission member 60 including a first end rotatable with respect to the chest 200 and a second end coupled to the forearm 30. The upper arm 20, the forearm 30 and the forearm transmission member 60 are arranged in such a way that the forearm 30 rotates when the upper arm 20 rotates with respect to the chest 200. The first end of the forearm transmission mechanism 60 is rotatably coupled to the fixed post 90. The rotary joint 70 defines a groove 73 passing therethrough. One end of the fixed post 90 passes through the groove 73 and one of the two shells 21. The groove 73 is arc-shaped and centered on the rotation axis of the rotary joint 70. The fixed post 90 is located below the output shaft 101 of the servo 10.

Figure 6:
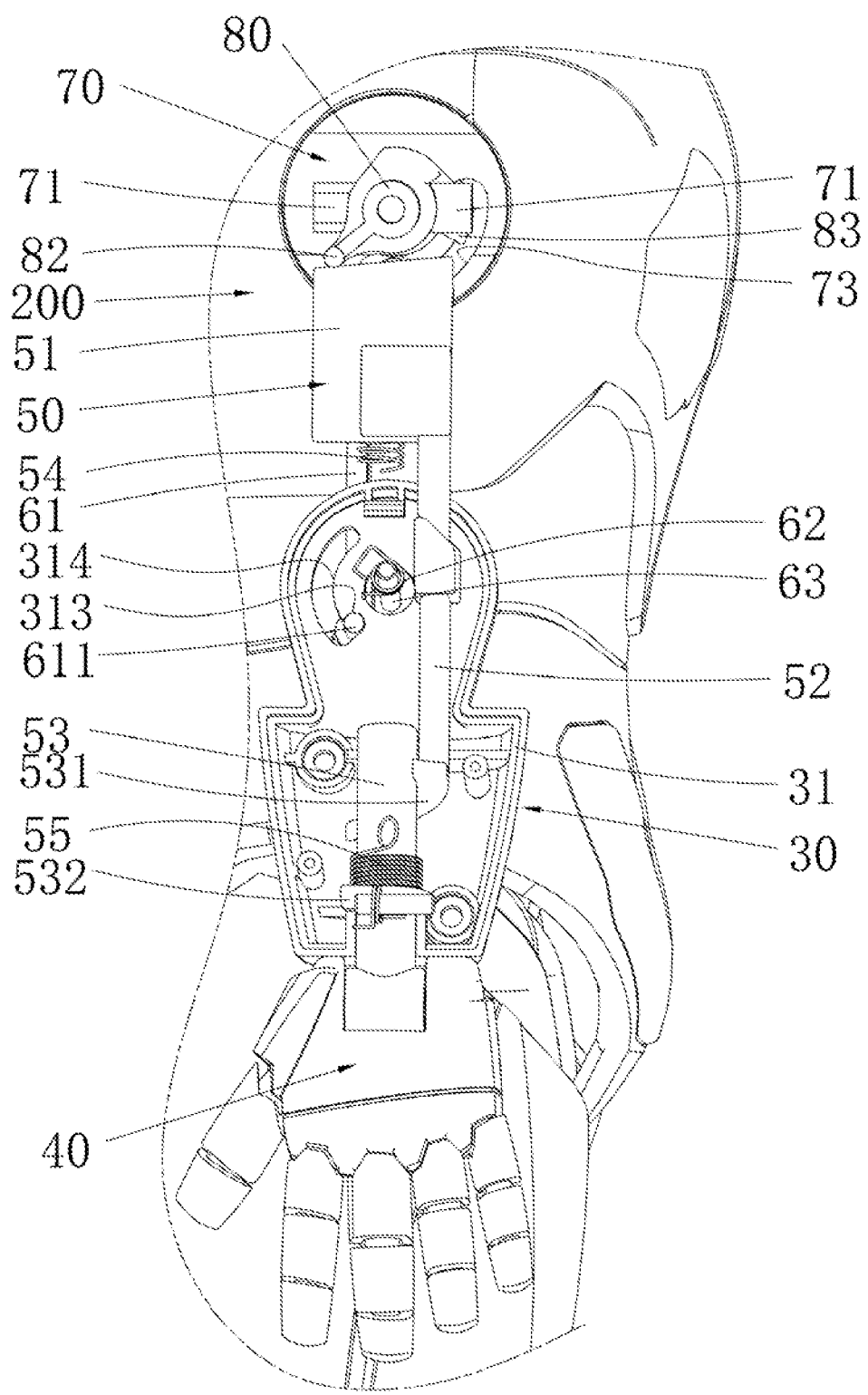
FIG. 6 is an isometric view of the leg assembly of the robot of FIG. 1, with certain components omitted for clarity.
Figure 7:
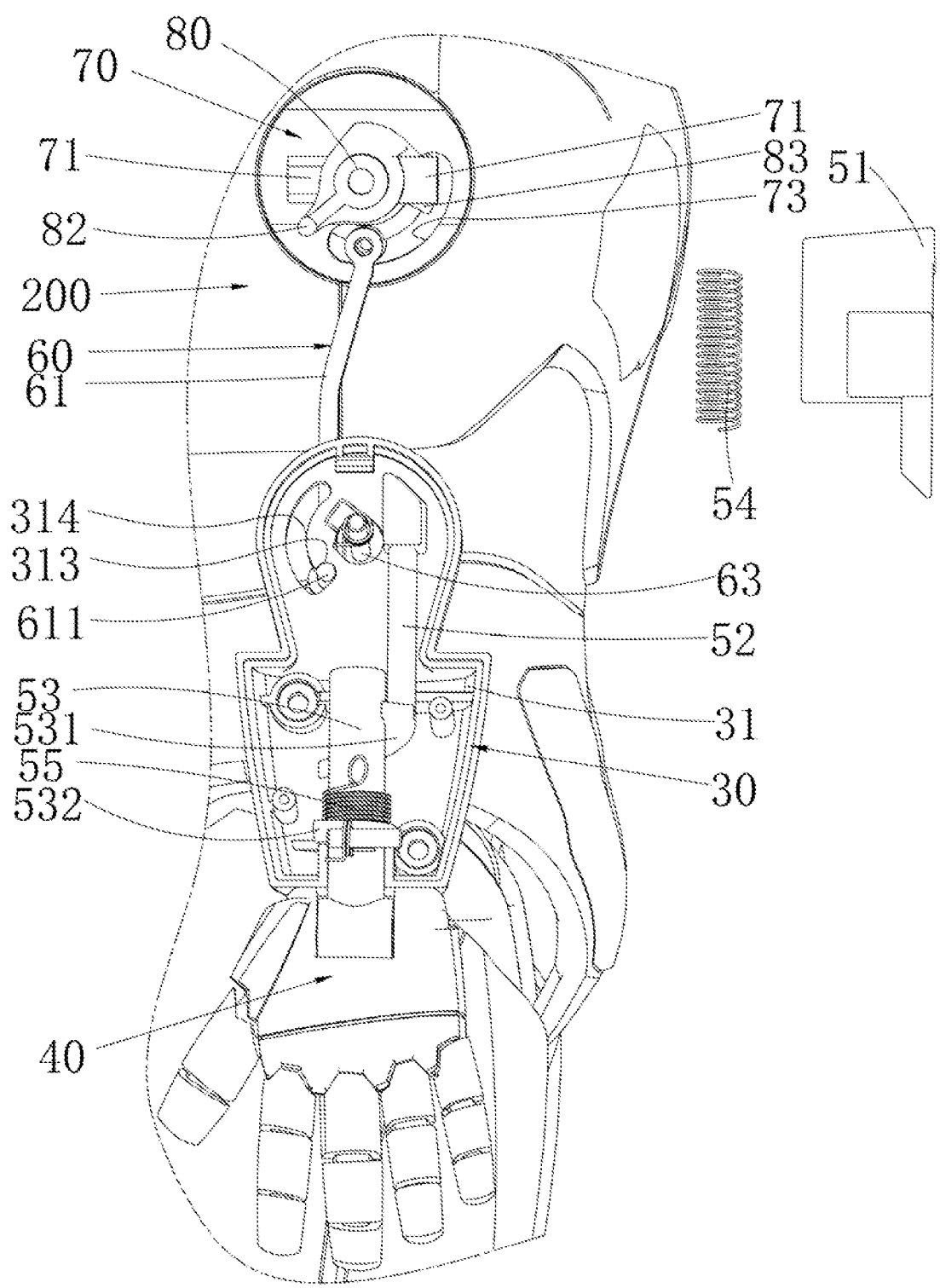
FIG. 7 is similar to FIG. 5 but viewed from a different perspective.

Referring to FIGS. 2-4 and 8-9, in one embodiment, the hand transmission mechanism 50 includes a first sliding member 51 slidably connected to the upper arm 20 and urged to move by the first lever 82, a second sliding member 52 slidably connected to the forearm 30 and urged to move by the first sliding member 51, and a worm 53 rotatably mounted to the forearm 30 and connected to the hand 40. The worm 53 has a helical tooth 531 that abuts against the second sliding member 52 so as to rotate when pushed by the second sliding member 52. Referring to FIGS. 6 and 7, the servo 10 drives the rotary joint 70 to rotate. The position of the fixed post 90 is fixed. When the rotary joint 70 rotates in a clockwise direction, the rotating member 80 rotates together with the rotary joint 70 and the second lever 83 approaches the fixed post 90. After the second lever 83 comes into contact with the fixed post 90, further rotation of the rotary joint 70 will cause the rotating member 80 to rotate, in a counterclockwise direction, with respect to the rotary joint 70. The first lever 82 then pushes the first sliding member 51 to move downward. The first sliding member 51 then pushes the second sliding member 52 to move downward. Since the lower end of the second sliding member 52 abuts against the helical tooth 531, the worm 53 rotates as the second sliding member 52 moves downward, which drives the hand 40 to rotate about the first axis 401 extending along a lengthwise direction of the forearm 30.

Figure 2:
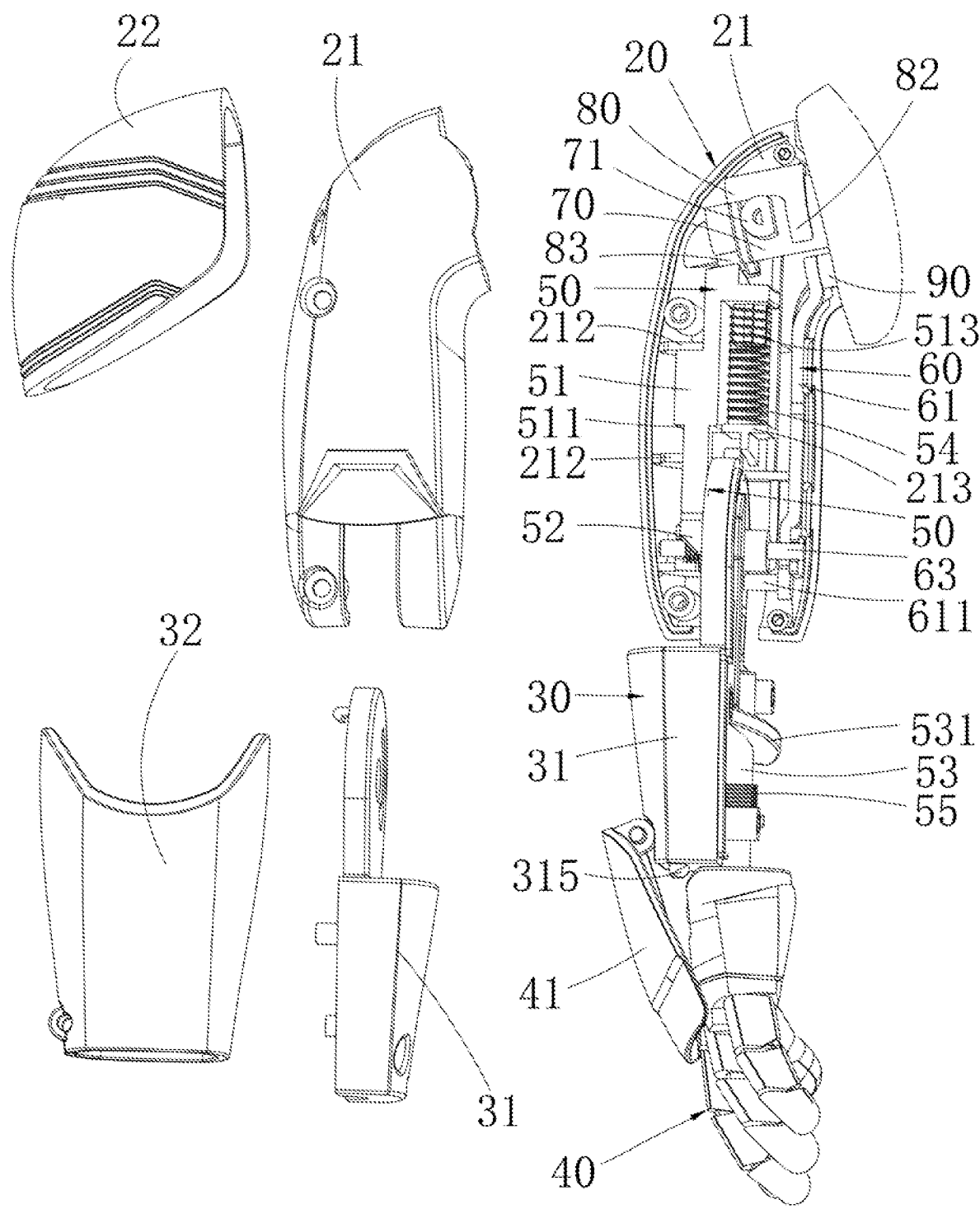
FIG. 2 is an isometric partially exploded view of an arm assembly of the robot of FIG. 1.
Figure 3:
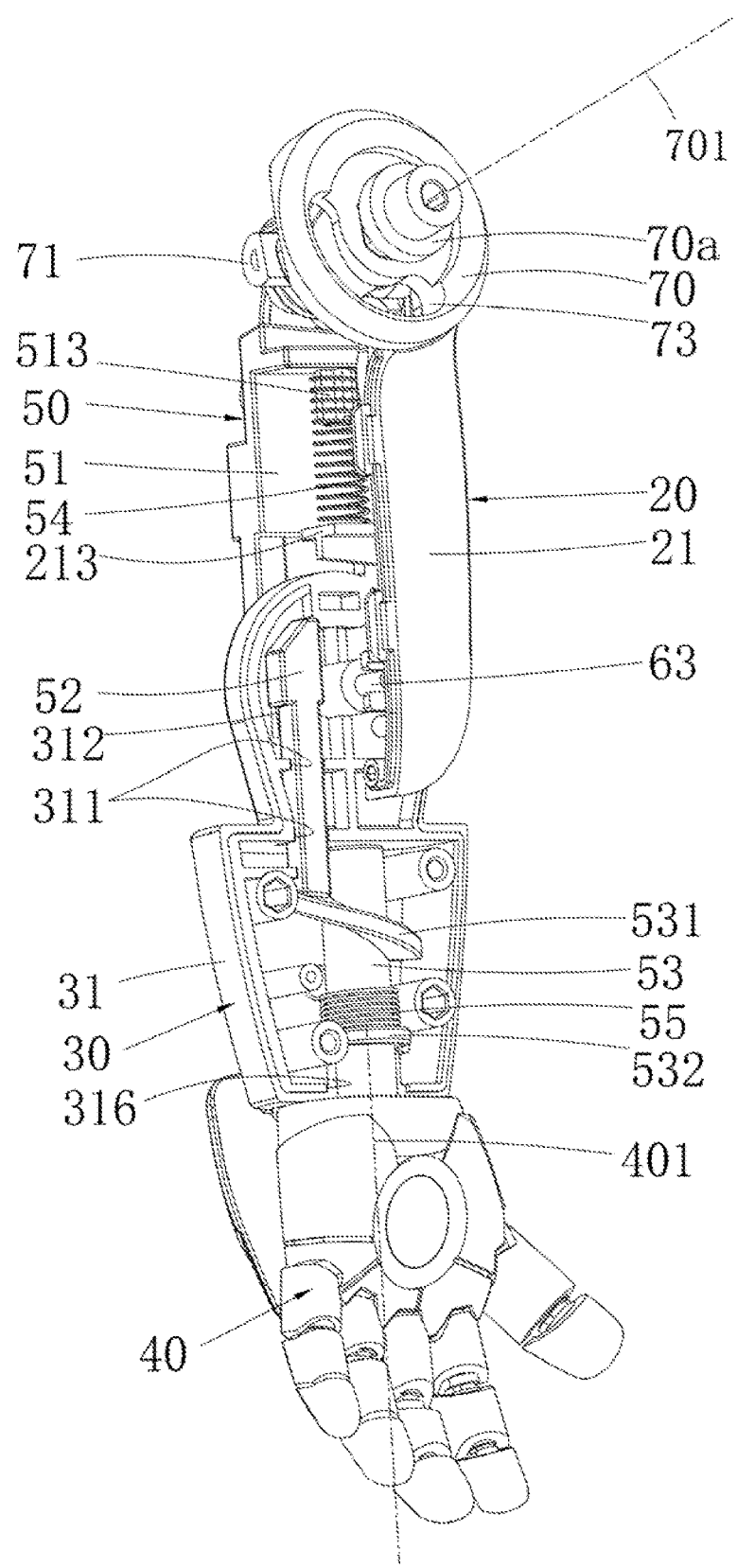
FIG. 3 is an isometric view of the leg assembly of the robot of FIG. 1, with certain components omitted for clarity.
Figure 4:
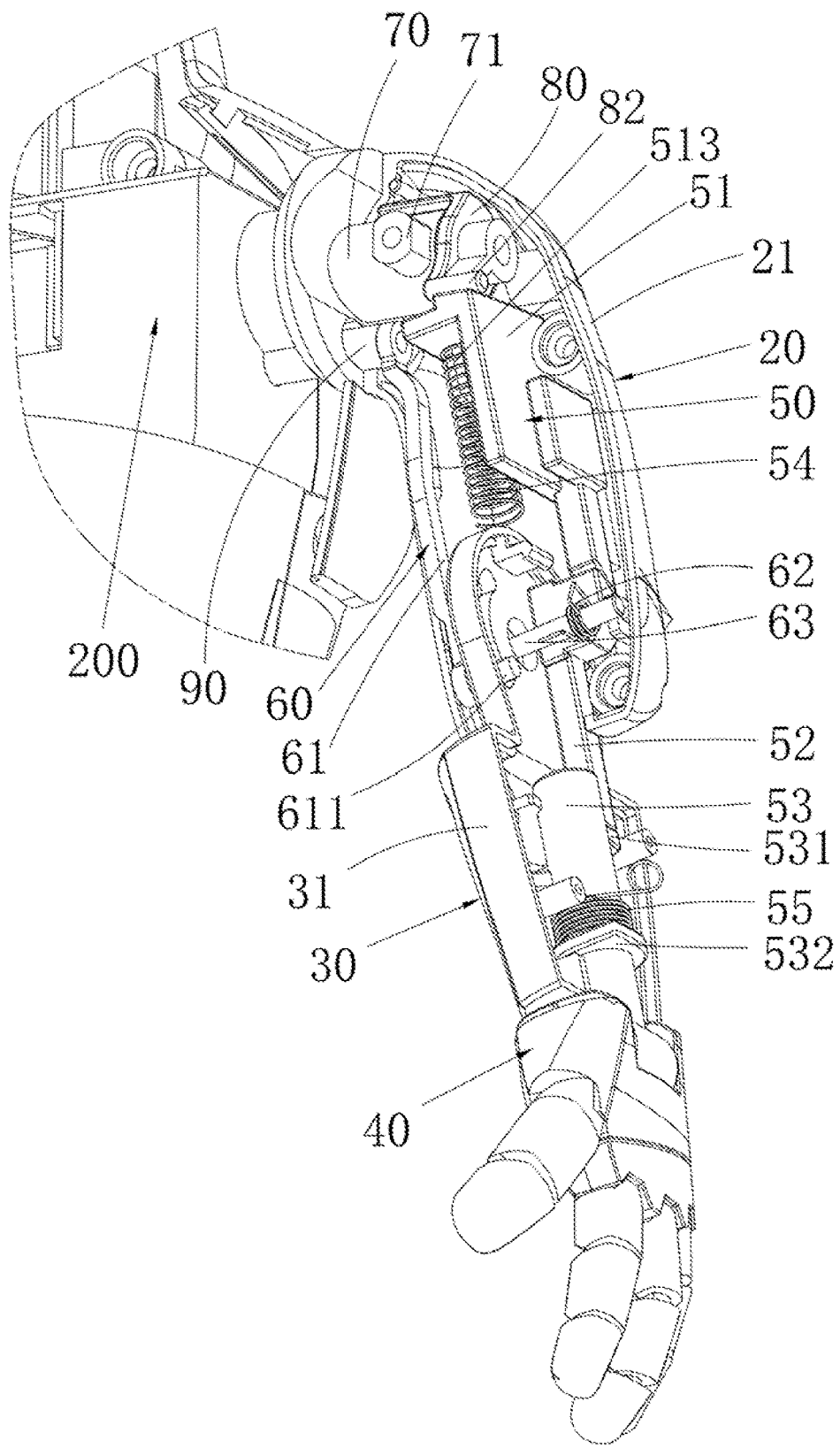
FIG. 4 is similar to FIG. 3 but viewed from a different perspective.
Figure 5:
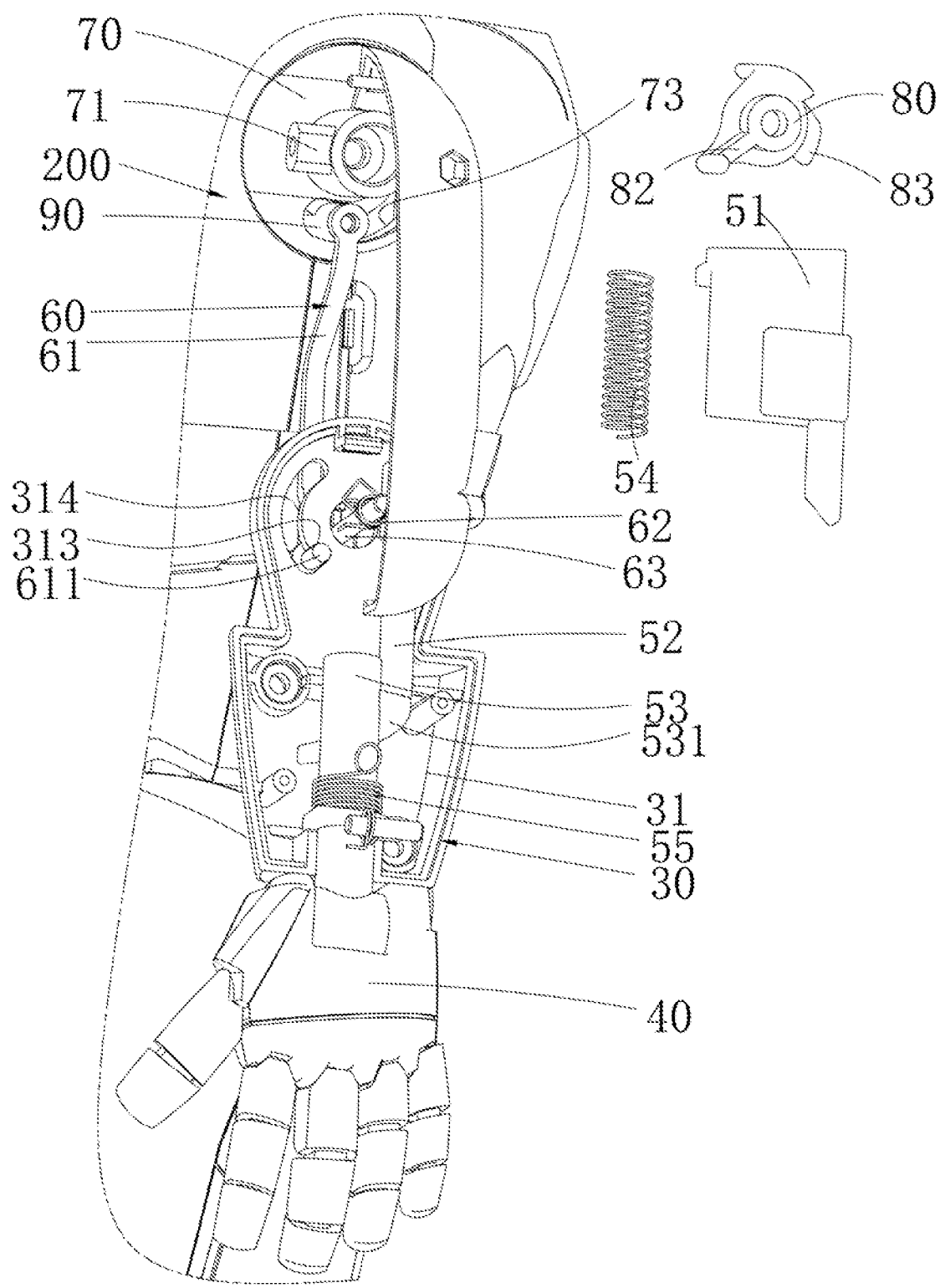
FIG. 5 is an isometric partially exploded view of the arm assembly of FIG. 4.
Figure 8:
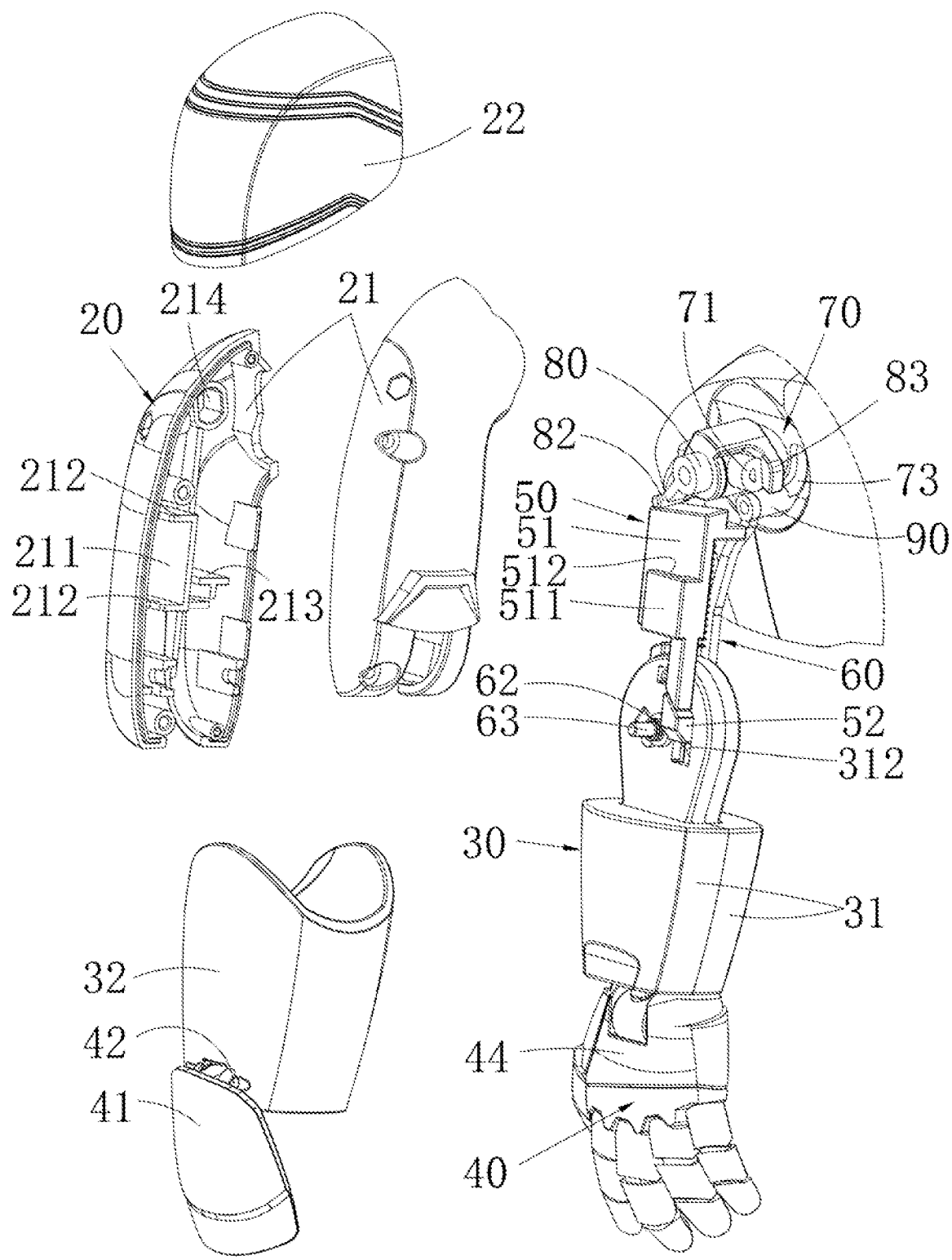
FIG. 8 is an isometric partially exploded view of an arm assembly of the robot of FIG. 1.
Figure 9:
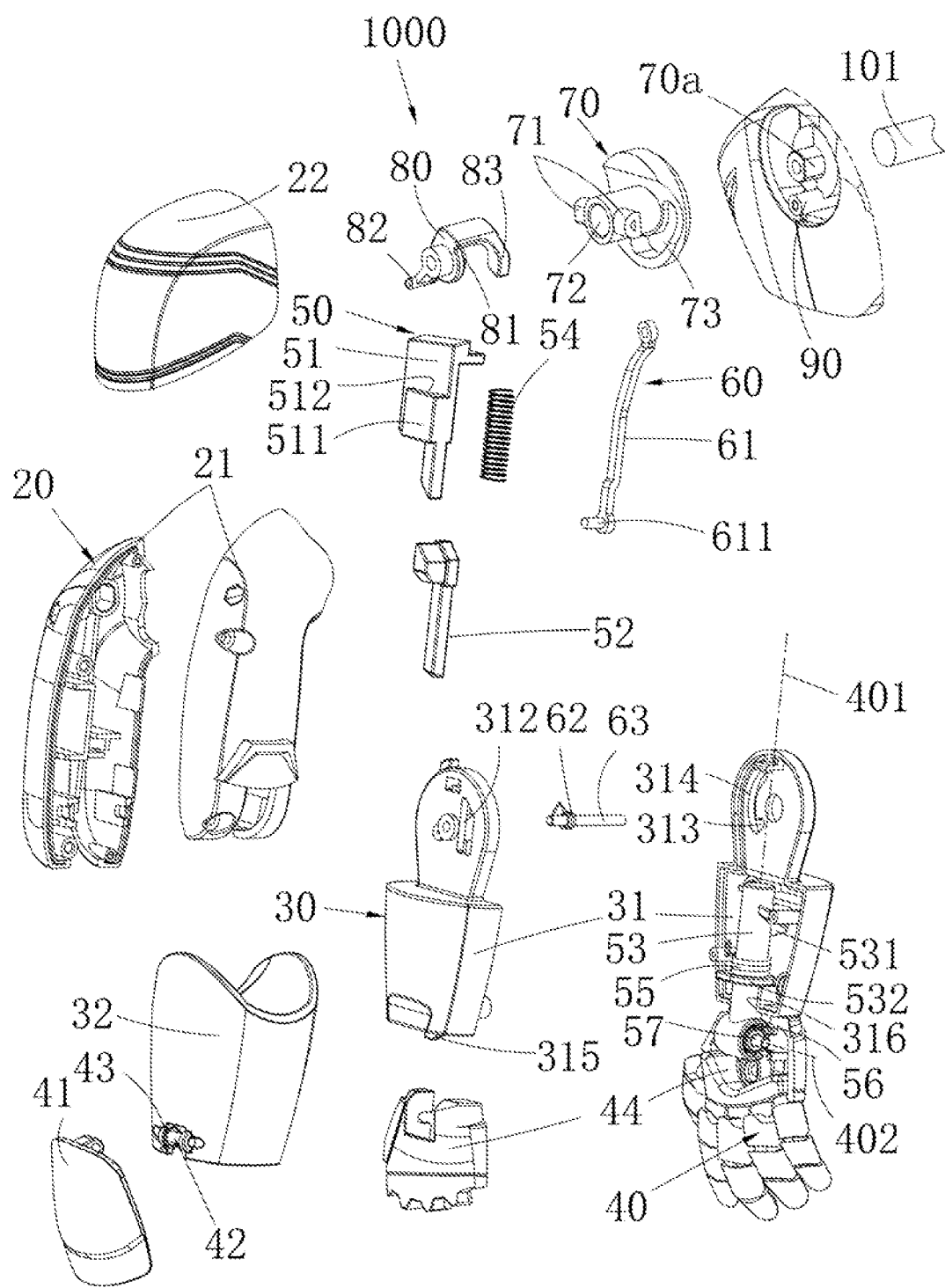
FIG. 9 is an isometric exploded view of an arm assembly of the robot of FIG. 1.

Referring to FIGS. 2, 8 and 9, the upper arm 20 has a longitudinal rib 211 extending along the longitudinal direction thereof and two lateral ribs 212 spaced apart from each other. The first sliding member 51 includes an L-shaped limiting wall 511, and the first sliding member 51 and the limiting wall 511 form a recess 512. The longitudinal rib 211 and the recess 512 corporately define a sliding direction of the first sliding member, and the limiting wall 511 and the lateral ribs 212 corporately define a moving range of the first sliding member. Referring to FIG. 3, the forearm 30 defines a sliding groove 311 extending along the lengthwise direction thereof for slidably receiving the second sliding member 52 therein. The forearm 30 defines a through hole 316 through which the worm 53 passes. The outer surface of the worm 53 is provided with a limiting portion 532. The limiting portion 532 is engaged with the inner wall of the forearm 30 to prevent axial movement of the worm 53 so that the worm 53 can only rotate.

Referring to FIGS. 3, 8 and 9, one of the two shells 31 is provided with a through hole 312. The upper abutting end of the second sliding member 52 passes through the through hole 312 to abut against the lower abutting portion of the first sliding member 51. Both the upper abutting end of the second sliding member 52 and the lower abutting portion of the first sliding member 51 are provided with abutting slopes, so that the first sliding member can easily push second sliding member 52 to move. The lower abutting portion of the second sliding member 52 has an abutting curved surface adapted to the helical tooth 531, so that the lower abutting portion of the second sliding member 52 can easily push the helical tooth 531 to rotate the worm 53.

Referring to FIGS. 2, 3 and 9. in one embodiment, the hand transmission mechanism 50 further includes a first elastic member 54 connected to the upper arm 20 and used to return the first sliding member 51 to its original position when the first lever 82 is disengaged from the first sliding member 51, and a second elastic member 55 connected to the forearm 30 and used to return the worm 53 to its original position. The first elastic member 54 may be a spring. The first sliding member 51 includes a post 513 on which the first elastic member 54 is mounted. The upper arm 20 includes a wall 213 against which an end of the first elastic member 54 abuts. When the rotating member 80 pushes the first sliding member 51, the first elastic member 54 is compressed. When the first arm 82 of the rotating member 80 is disengaged from the first sliding member 51, the restoring force of the first elastic member 54 returns the first sliding member 51 to its original position. The second elastic member 55 can be a torsion spring arranged around the worm 53. Two arms of the torsion spring are respectively connected to the forearm 30 and the worm 53.

Referring to FIGS. 5-7 and 9, in one embodiment, the forearm 30 defines a recess 313. The forearm transmission mechanism 60 is a linkage bar 61 and the linkage bar 61 includes a sliding post 611 at the second end that is movably received in the recess 313. The sliding post 611 and the recess 313 are configured in such a way that the forearm transmission mechanism 6 pulls the forearm to rotate with respect to the upper arm when the upper arm starts to rotate upward from an original position. Specifically, the upper arm 20, the lower arm 30, the forearm transmission mechanism 60 and the chest 200 corporately form a four-bar linkage mechanism. When the servo 10 drives the upper arm 20 to rotate, the forearm transmission mechanism 60 pulls, via the sliding post, the forearm 30 to flex. That is, the forearm 30 is pulled to rotate toward the upper arm 20.

In one embodiment, the forearm 30 defines a sliding groove 314 that is in communication with the recess 313. The sliding post 611, the recess 313 and the sliding groove 314 are configured in such way that the sliding post 611 moves out of the recess 313 and into the sliding groove 314 after the forearm 30 has rotated for a predetermined angle. The sliding groove 314 is arch-shaped and centered on the rotation axis of the forearm 30. The recess 313 extend in the radial direction and arranged at the end of the sliding groove 314 away from the fixed post 90. In one embodiment, the arm assembly 1000 further includes a fourth elastic member 62 to apply a restoring force to the forearm 30 so as to drive the forearm 30 to rotate such that the arm assembly 1000 returns back to a fully extended slate, after the upper arm has rotated for a preset angle. The fourth elastic member 62 can be a torsion spring, and the torsion spring is arranged around the pivot shaft 63 that connects the upper arm 20 to the forearm 30. Two arms of the torsion spring abut against the upper arm 20 and the forearm 30, respectively. After the upper arm 20 has rotated back to its original position, the sliding post 611 will move from the sliding groove 314 back to the recess 313.

Referring to FIGS. 1-2 and 8-9, in one embodiment, the forearm 30 includes a protrusion 315 that is configured in such a way that the protrusion 315 applies a push force to the hand 40 when the hand rotates about the first axis 401 and comes into contact with the protrusion 315 such that the hand 40 rotates with respect to the forearm 30 about a second axis 402 that is perpendicular to the first axis 401. That is, the dorsum of the hand 40 rotates toward the forearm 30. The hand 40 is rotated by the worm 53. During the rotation, the protrusion 315 will come into contact with the hand 40. Since the protrusion 315 has a transitional arc surface, the hand 40 will be pushed to rotate.

Referring to FIG. 9, the hand 40 includes a third elastic member 56 to apply a restoring force to the hand 40 to rotate the hand 40 about the second axis 402 from an extension state to an original state. Specifically, the hand 40 is rotatably connected to one end of the worm 53 via a pivot shaft 57. The rotation axis between the hand 40 and the worm 53 is perpendicular to the rotation axis of the forearm 30. The third elastic member 56 may be a torsion spring arranged around the pivot shaft 57 between the hand 40 and the worm 53. Two arms of the torsion spring are respectively connected to the hand 40 and the worm 53.

In one embodiment, the arm assembly 1000 further includes a hand shield 41 rotatably connected to the forearm 30 and a fifth elastic member 43 that is connected to the forearm 30 and used to apply a restoring force to the hand shield 41 when the hand 40 rotates from the extension state to the original state. The hand shield 41 protects the hand 40 and prevents external forces from damaging joint of the hand 40. The hand shield 41 is rotatably connected to the forearm shield 32 via a pivot shaft 42. The free end of the hand shield 41 abuts against the dorsum of the hand 40. The fifth elastic member 43 may be a torsion spring arranged around the pivot shaft 42 between the hand shield 41 and the forearm shield 32. Two arms of the torsion spring are respectively connected to the hand shield 41 and the forearm shield 32. When the hand 40 extends with respect to the forearm 30, the hand shield 41 will be pushed to rotate and the torsion spring is twisted. When the hand 40 rotates back, the torsion spring rebounds and pushes the hand shield 41 to return to its original position.

Referring to FIG. 1, a robot according to an embodiment includes an arm assembly as described above. The arm assembly uses only one servo to drive the upper arm 20 and the forearm 30, which saves cost and facilitates simplification of motion control algorithm of the robot.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An arm assembly of a robot comprising a chest, the arm assembly comprising:
   a servo coupled to the chest;
   an upper arm driven by the servo;
   a forearm rotatably coupled to the upper arm;
   a hand connected to an end of the forearm and rotatable about a first axis extending along a lengthwise direction of the forearm;
   a hand transmission mechanism connected to the upper arm and the hand;
   a rotary joint, wherein the servo comprises an output shaft, the rotary joint is fixed to the output shaft and the upper arm; and
   a rotating member rotatably and coaxially connected to the rotary joint and a fixed post securely connected to the chest, wherein the rotating member comprises a first lever and a second lever that are circumferentially spaced apart from each other, the second lever is configured to contact the fixed post such that the rotating member can be pushed by the fixed post to rotate with respect to the rotary joint, when the rotating member rotates, the first lever is engaged with the hand transmission mechanism to drive the hand transmission mechanism that drives the hand to rotate about the first axis.

2. The arm assembly of claim 1, wherein the hand transmission mechanism comprises a first sliding member slidably connected to the upper arm and urged to move by the first lever, a second sliding member slidably connected to the forearm and urged to move by the first sliding member, and a worm rotatably mounted to the forearm and connected to the hand, the worm comprises a helical tooth that abuts against the second sliding member so as to rotate when pushed by the second sliding member.

3. The arm assembly of claim 2, wherein the hand transmission mechanism comprises a first elastic member connected to the upper arm and configured to return the first sliding member to an original position thereof when the first lever is disengaged from the first sliding member, and a second elastic member connected to the forearm and configured to return the worm to an original position thereof.

4. The arm assembly of claim 2, wherein the upper arm comprises a longitudinal rib extending along a longitudinal direction thereof and two lateral ribs spaced apart from each other, the first sliding member comprises an L-shaped limiting wall, the first sliding member and the limiting wall form a recess, the longitudinal rib and the recess corporately define a sliding direction of the first sliding member, and the limiting wall and the lateral ribs corporately define a moving range of the first sliding member.

5. The arm assembly of claim 1, wherein the forearm comprises a protrusion that is configured in such a way that the protrusion applies a push force to the hand when the hand rotates about the first axis and comes into contact with the protrusion such that the hand rotates with respect to the forearm about a second axis that is perpendicular to the first axis.

6. The arm assembly of claim 5, wherein the hand comprises an elastic member to apply a restoring force to the hand to rotate the hand about the second axis from an extension state to an original state.

7. The arm assembly of claim 1, further comprising a hand shield rotatably connected to the forearm and an elastic member that is connected to the forearm and configured to apply a restoring force to the hand shield when the hand rotates from the extension state to the original state.

8. A robot comprising a chest and an arm assembly, the arm assembly comprising:
a servo coupled to the chest;
an upper arm driven by the servo;
a forearm rotatably coupled to the upper arm;
a hand connected to an end of the forearm and rotatable about a first axis extending along a lengthwise direction of the forearm;
a hand transmission mechanism connected to the upper arm and the hand;
a rotary joint, wherein the servo comprises an output shaft, the rotary joint is fixed to the output shaft and the upper arm; and
a rotating member rotatably and coaxially connected to the rotary joint and a fixed post securely connected to the chest, wherein the rotating member comprises a first lever and a second lever that are circumferentially spaced apart from each other, the second lever is configured to contact the fixed post such that the rotating member can be pushed by the fixed post to rotate with respect to the rotary joint, when the rotating member rotates, the first lever is engaged with the hand transmission mechanism to drive the hand transmission mechanism that drives the hand to rotate about the first axis.

9. The robot of claim 8, wherein the hand transmission mechanism comprises a first sliding member slidably connected to the upper arm and urged to move by the first lever, a second sliding member slidably connected to the forearm and urged to move by the first sliding member, and a worm rotatably mounted to the forearm and connected to the hand, the worm comprises a helical tooth that abuts against the second sliding member so as to rotate when pushed by the second sliding member.

10. The robot of claim 9, wherein the hand transmission mechanism comprises a first elastic member connected to the upper arm and configured to return the first sliding member to an original position thereof when the first lever is disengaged from the first sliding member, and a second elastic member connected to the forearm and configured to return the worm to an original position thereof.

11. The robot of claim 9, wherein the upper arm comprises a longitudinal rib extending along a longitudinal direction thereof and two lateral ribs spaced apart from each other, the first sliding member comprises an L-shaped limiting wall, the first sliding member and the limiting wall form a recess, the longitudinal rib and the recess corporately define a sliding direction of the first sliding member, and the limiting wall and the lateral ribs corporately define a moving range of the first sliding member.

* * * * *